Sept. 27, 1960
A. P. JACKEL
2,954,511
DRIVER CIRCUIT FOR REVERSIBLE COUNTING CHAINS
Filed Sept. 23, 1957
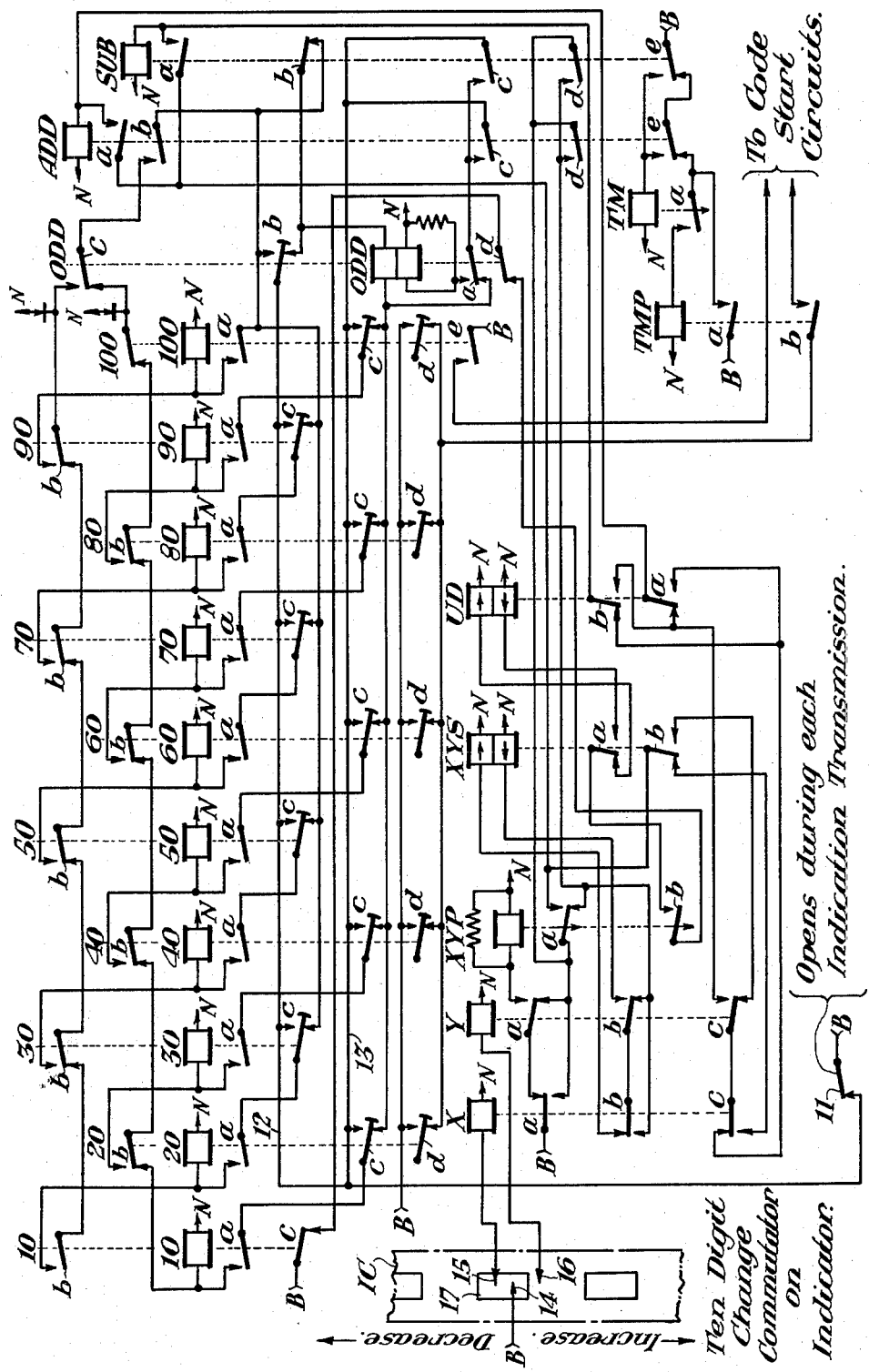

Untied States Patent Office 2,954,511
Patented Sept. 27, 1960

2,954,511

DRIVER CIRCUIT FOR REVERSIBLE COUNTING CHAINS

Arthur P. Jackel, Penn Township, Allegheny County, Pa., assignor to Westinghouse Air Brake Company, Wilmerding, Pa., a corporation of Pennsylvania Filed Sept. 23, 1957, Ser. No. 685,655

4 Claims. (Cl. 317—140)

My invention relates to a driver circuit for reversible counting chains. More particularly, my invention relates to a circuit arrangement which senses specific changes in a measured item and the direction of those changes, and controls a reversible counting chain to record the total change in the measured item from a selected reference point.

Reversible counting chains, particularly the relay type, are well known in the prior art. They are useful in connection with certain types of material transmission systems, such as oil or gas pipelines, to record the deviation from a selected reference point of certain measured items such as flow rate, line pressure, and similar factors. Such reversible counting chains measure and indicate only the deviation from the selected reference point and not the total quantity of the item which is otherwise measured and transmitted, generally by telemeter code, to the remote control location. It is desirable, of course, to reduce the amount of equipment required. One means is to change frequently the selected reference point from which the deviation is counted so that the reversible counting chain may be provided with the minimum number of relays or other recording devices. It is generally satisfactory to change the reference point from which the deviation is indicated each time the data is transmitted to the central control location. Such a reset of the reference point must be handled automatically as a result of the transmission of the previous reading. In such systems it is also desirable to indicate to the control operator when rapid deviations are occurring. Generally, an indication of the total deviation from the reference point of the measured item is transmitted on a time basis or when the deviation in either direction totals a selected amount, to the central office along with other measured information. However, rapid deviations or "upset" indications, if rapidly transmitted, allow corrective action to be taken before damage or failure occurs.

In order to use the reversible counting chain in the manner previously described, a proper driver circuit arrangement must be provided. This driver circuit must sense, i.e., detect, the change in the measured item and the direction of that change; for example, an increase or decrease in the value of the measured item. It is to be noted that the unit of change will be preselected so that each count indicates the same amount of deviation. The driver circuit must be capable of briefly recording the change and its direction prior to the entry of the count into the counting chain. In addition, only one count must be entered each time the measured item changes the preselected amount, that is, only one addition or subtraction must be entered in the reversible counting chain for each unit of change of the item. The driver circuit necessarily, after the reset of the reference point, must be able to establish the initial direction of the change so that the proper recording of the deviation is possible.

Accordingly, it is an object of my invention to provide a reversible counting means to indicate the amount and the direction of the deviation of a measured item from a selected zero reference point.

It is also an object of my invention to provide a reversible counting means to indicate the amount and direction of the deviation of a measured item from a zero reference point which may be reset to the existing level of the measured item after each data transmission.

Another object of my invention is to provide a driver circuit arrangement for reversible counting chains to add or subtract each new count from the previously recorded total count in accordance with the direction of the deviation of the item being measured.

A still further object of my invention is to provide a driver circuit for reversible counting chains which senses the amount and direction of change of a measured item and operates the chain accordingly to add or subtract the unit count.

It is also an object of my invention to provide a driver circuit means for reversible counting chains which senses and stores the direction of change from the selected reference point of the initial count and also senses the relative direction of each subsequent unit count.

A further object of my invention is to provide a driver circuit means for counting chains which distinguishes between normal, gradual changes in the measured item and relatively rapid changes which may indicate fault conditions.

Other objects and features of my invention will become apparent from the following specification when taken in connection with the accompanying drawing.

In practicing my invention, I provide a reversible counting chain of any well known construction and a driver circuit arrangement therefor. The driver circuit includes an indicator of the change in the measured item, the indicator being divided into selected increments of deviation. Each increment of change in the measured item is detected by the sequential energization of two sensing relays. The order or sequence of energization of the two relays denotes the direction of the change, for example, an increase or decrease in the measured item. These two sensing relays are repeated by a slow release repeater and by a stick relay. The stick relay repeats the direction of change by occupying a first or a second position. There is also provided a second direction stick relay to establish the direction of the initial increment of change from the selected zero reference point. This second direction stick relay is responsive only when the counting chain is at zero, that is, has been set to a reference level. The second direction stick relay then repeats the position of the sensing stick relay to indicate the direction of the initial change. Two driver relays directly control the reversible counting chain, only one of these relays being energized at a time, one to add a count to the chain and the other to subtract a count from a previous total. The selected relay is energized as the indicator passes out of the position detecting the change. The actual selection of the driver relay to be energized is controlled by the direction stick relay and the sensing stick relay to establish the relative direction of each unit of change. Driven by one or the other of the two driver relays, the reversible counting chain operates to add or subtract the new count from the previous total.

As part of the overall system of my invention, there is provided an indication system by which the total deviation from the reference level may be reported to a control location. Normally, these indication reports are transmitted periodically and indicate the total change and the direction since the last report. At the end of each such reporting period, the counting chain is reset to zero so that subsequent changes in the measured item are recorded from the new reference level. I also provide a pair of timing relays to initiate a special report if the rate of change exceeds a selected amount, such that a condition of failure or fault is indicated.

Referring now to the drawing, the single figure thereof shows diagrammatically a reversible counting chain of the relay type and one form of driver circuits for this chain which embody my invention.

In this drawing, certain conventions have been followed to simplify the circuit arrangement as shown therein. Certain of the relays have transfer contacts which are of the continuity type, that is, when the relay is energized and the armature picks up, front contact circuits are completed before back contact circuits are broken. Such continuity transfer contacts are indicated in the drawing by the conventional symbol, a short arc appended to the free end of the movable portion of the contact. Transfer contact c of counting relay 20 is an example of such continuity type transfer contacts, as shown in the drawing. If a relay is provided with slow release characteristics, so that its front contacts remain closed for a selected period of time after the relay is deenergized, a conventional vertical arrow, pointing downward, is drawn through the movable portion of the contact. Certain of the relays are of the magnetic stick type and are distinguished from neutral relays by horizontal arrows shown within the symbol for the relay winding and by the vertical positioning of the relay contacts. The operation of these relays is such that, when current flows through a relay winding in the direction of the arrow shown therein, the relay contacts are operated to their left-hand or normal positions. If the current flow through the relay winding is in the direction opposite to the arrow within the winding symbol, the relay contacts are operated to close right-hand or reverse contacts. The stick characteristic of these relays holds the contacts in the position to which they were last operated when the relay winding or windings are deenergized. The apparatus shown in the drawing is provided with a local source of direct current energy, such as a battery of suitable size and voltage. However, for simplicity, this battery is not shown, its positive and negative terminals only being indicated by the conventional symbols B and N, respectively.

Referring again to the drawing, there is shown therein a reversible relay counting chain which includes the counting relays, numbered by tens, from 10 to 100, inclusive, and the selection relay ODD. The counting relays are designated by tens because, in the specific example shown, the selected unit of change of the measured item is ten digits. It is to be understood that the reversible counting chain may have more or less relays and could obviously be other than a relay counting chain. This counting chain is driven by contacts of the driver relays ADD and SUB, these driver relays being described in more detail hereinafter. At present, it is sufficient to understand that when relay ADD is energized and closes its front contacts, a count is added to the previous total recorded in the counting chain. If relay SUB is energized, the new count is subtracted from the previous total recorded in the counting chain.

I shall assume that the counting chain is in its zero position, that is, all of the counting relays and relay ODD are released which is the position shown in the drawing. I will further assume relay ADD picks up to close its front contacts. This establishes a circuit for energizing the first counting relay 10 which circuit may be traced from terminal B at the normally closed contact 11 over bus wire 12, back contact b of relay ODD, back contact b of relay SUB, front contact b of relay ADD, back contact c of relay ODD, back contacts b in series of relays 100, 80, 60, 40, and 20, and the winding of relay 10 to terminal N. The normally closed contact 11 in the described circuit is arranged to be opened each time an indication is transmitted from the location of the apparatus shown in the drawing to a central control office, remotely located, at which an operator is situated who must be periodically supplied with information as to the change in the measured item as recorded in the reversible counting chain. The opening of contact 11 interrupts the supply of energy from positive terminal B of the local source to bus wires 12 and 13. These two bus wires may be, for purposes of the general description, considered normally energized and thus equivalent to the positive source of local energy.

Relay 10, energized as previously described, picks up and closes its front contacts, completing an initial stick circuit which at this time includes front contact c of relay ADD, back contact a of relay ODD, back contact c of relay 20, and front contact a and the winding of relay 10. It is to be noted that, at this time, both terminals of the upper winding of relay ODD are connected to terminal B so that the relay winding is shunted and the relay remains in its released condition. Shortly, as will be discussed hereinafter, relay ADD releases and the opening of its front contact c removes positive energy from the left terminal of the winding of relay ODD which allows this relay to be energized by the circuit traced from bus wire 12 over back contact b of relay ODD, the upper winding of relay ODD, back contact c of relay 20, and front contact a and the winding of relay 10 to terminal N. This circuit, in addition to energizing relay ODD which then picks up, retains relay 10 energized and held up.

Since transfer contact b of relay ODD is of the continuity type, the circuit for retaining relay ODD energized, which includes back contact b of relay SUB and front contact b of relay ODD, is completed prior to the interruption of the original energizing circuit and relay ODD and similarly relay 10 remain energized through this period. As will appear in more detail hereinafter, relay ODD picks up at the end of a count when an odd number of the counting chain relays are energized and picked up. Relay ODD releases at the end of a count when an even number of the counting relays are energized and picked up. The operation of relay ODD, at the end of each count entered into the counting chain, prepares the circuit for the next count whether the next count be an addition or a subtraction.

It will now be assumed that relay ADD picks up again. At this time, a circuit is completed for energizing relay 20, traced from bus wire 12 over front contact b of relay ODD, front contact b of relay ADD, front contact c of relay ODD, back contacts b, in series, of relays 90, 70, 50, and 30, front contact b of relay 10, and the winding of relay 20 to terminal N. Relay 20, thus energized, picks up and closes its front contact a to complete a first stick circuit for itself which also includes back contact c of relay 30, and front contact b of relay ODD. Continuity transfer contact c of relay 20 opens the back contact and closes the front contact to complete a final stick circuit for relay 10, the continuity contact assuring that energy is never removed from the winding of relay 10 during this operation.

The closing of front contact c of relay ADD completes a stick circuit for relay ODD which further includes front contact a and the lower winding of relay ODD. This stick circuit replaces the original stick circuit which is now open at back contact c of relay 20 and assures that relay ODD remains energized during this counting step. When relay ADD releases at the end of this step, relay ODD is likewise deenergized and releases. However, relay 20 is held energized continuously, initially over the stick circuit already traced and then over the stick circuit including back contacts b of relays ODD and SUB. Again, the continuity transfer contact b of relay ODD assures that relay 20 is never deenergized during this operation. This release of relay ODD prepares circuits for the operation of the chain during the next count, as will be seen hereinafter.

If relay ADD picks up again, counting relay 30 will now be energized, the circuit being similar to that previously traced for relay 10 with the exception of including front contact *b* of relay 20 and the winding of relay 30. Relay 30 initially sticks over its own front contact *a*, back contact *c* of relay 40, back contact *a* of relay ODD, and front contact *c* of relay ADD which is similar to the circuit for initially holding relay 10 energized. The closing of front contact *c* of relay 30 completes the final stick circuit for relay 20 with the continuity transfer contact assuring that relay 20 is never deenergized during the shifting of the stick circuit. Again relay ODD is held released, by positive energy applied to both terminals of the upper winding, until relay ADD releases to open its front contact *c*. At this time, a circuit is completed over back contact *b* and the upper winding of relay ODD, back contact *c* of relay 40, and front contact *a* and the winding of relay 30 to energize relay ODD which picks up, completing a stick circuit for itself and a second stick circuit for relay 30 in the manner previously described for relay 10.

It will now be assumed that the next unit of change to be entered in the counting chain is in the opposite direction so that relay SUB picks up to close its front contacts. The closing of front contact *c* of relay SUB completes a stick circuit for relay ODD including the lower winding and front contact *a* of the relay, front contact *c* of relay SUB, and bus wire 13. The opening of back contact *b* of relay SUB interrupts the stick circuit by which the upper winding of relay ODD is energized and likewise the winding of relay 30. This latter relay, thus deenergized, releases at this time to subtract a count from the previous total stored within the counting chain. The stick circuit for relay 20 at this time is transferred by contact *c* of relay 30 from a direct connection to bus wire 12 to a connection over front contact *b* of relay ODD. When relay SUB releases at the end of the count period, relay ODD is also deenergized and releases. However, contact *b* of relay ODD transfers the stick circuit for relay 20 without interruption to include back contact *b* of relay SUB and back contact *c* of relay 30 as before. With relay ODD released, the circuit is thus prepared to deenergize relay 20 if the the next count entered is to be subtracted from the previous total. At the same time, the circuit including back contact *b* of relay SUB is prepared to add the next count by energizing relay 30 if such is appropriate, this circuit including front contact *b* of relay ADD as was previously described.

For purposes of this description, let us assume that relay SUB again picks up to subtract a second count from the previous total. Relay 20 is deenergized by the opening of back contact *b* of relay SUB and releases. Contact *c* of relay 20 transfers the stick circuit for relay 10 from the direct connection to bus wire 13 over front contact *c* to a connection over back contact *c*, back contact *a* of relay ODD, and front contact *c* of relay SUB. Relay ODD is initially held deenergized by the application of positive energy to both terminals of the upper winding. When relay SUB releases, opening its front contact *c*, relay 10 is held energized from bus wire 12 over back contact *b* of relay ODD, the circuit also including the upper winding of relay ODD, which thus energized, picks up establishing a stick circuit for itself and for relay 10 over its front contact *b* and back contact *b* of relay SUB. The picking up of relay ODD thus prepares the counting chain for the next operation which may either subtract a count by deenergizing relay 10 or add a count by again energizing relay 20, front contact *b* of relay ODD being the key connection in this circuit preparation.

With this understanding of the operation of the counting chain, I shall now proceed to describe in greater detail the operation of the driver circuit arrangement by which the counting chain operation is controlled. Each driving pulse for the relay counting chain is initiated by the sensing relays X and Y. These relays are energized by simple circuits from terminal B over brushes 14, 15 and 16 as completed by conducting segments such as 17 mounted in a commutator IC. The commutator IC is part of an indicator which measures a specific item such as, for example, the flow rate in a pipeline. The commutator is designed to provide an indication of the change in such a measurement, the data in the specific example listed being the change in the flow in barrels per minute. The surface of the commutator is divided into conducting and nonconducting segments, each pair corresponding to the unit of change selected for the system. For example, in such a flow indicator as here described, the unit of change to be recorded may be selected as a unit of ten barrels per minute of flow. The commutator is shown conventionally by a broken dot-dash rectangle designated by the reference IC. Inserted in the otherwise non-conducting surface of the commutator are electrically conductive segments shown conventionally by solid line rectangles such as 17. These conducting segments are of such length as to simultaneously cover, at one position of travel, all three of the brushes 14, 15 and 16. The spaces between the segments are of a similar size so that the circuits between brush 14 and both brushes 15 and 16 may be interrupted simultaneously. It is to be understood, of course, that other units of change may be selected for similar indicators and that other indicators may be used.

The direction of change is obviously indicated by the sequence of operation of relays X and Y, in accordance with the directional arrows adjacent to the portion of the commutator shown. The circuit for relay X is completed from terminal B through brush 14, segment 17, brush 15, and the winding of relay X to terminal N. A similar circuit for relay Y includes brushes 14 and 16, segment 17, and the winding of relay Y. If the commutator IC is moving in the direction to designate an increase in the rate of flow, segment 17, as in the position illustrated, completes the circuit between brushes 14 and 15 prior to the completion of the similar circuit between brushes 14 and 16 so that relay X is energized and picks up prior to the similar energization of relay Y. If the commutator is moving in the opposite direction to indicate a decrease in the rate of flow, the circuits for relays X and Y are completed in the reverse sequence.

Sensing relays X and Y are repeated by a sensing repeater relay XYP, which is energized only when front contacts *a* of relays X and Y are both closed. Relay XYP, as indicated conventionally, has slow release characteristics and is snubbed by a resistor in multiple with the relay winding.

The driver circuit arrangement also includes a sensing stick relay XYS. This relay is of the magnetic stick type having a double winding, each winding symbol including an arrow to show the direction of current flow necessary to cause the relay contacts to close in their normal or left-hand position in the manner previously described. The sensing stick relay repeats the direction of change of the item measured by sensing relays X and Y. In the specific example shown, relay XYS closes its normal contacts when the measured item is increasing in quantity and closes its reverse contacts when the item is decreasing in quantity.

When a unit of increase is initially recorded by the sequential operation of relays X and Y in that order, a circuit is completed from terminal B over front contact *a* of relay X, back contact *a* of relay Y, back contact *a* of relay XYP, back contact *b* of relay Y, front contact *b* of relay X, and the upper winding of relay XYS to terminal N. The flow of current in this circuit is through the upper winding in the direction of the arrow so that relay XYS operates its contacts to the left-hand position. If the unit of change recorded is a decrease, the circuit for relay XYS includes back contact *a* of relay X, back contact *a* of relay XYP, back contact *b* of relay X, front contact *b* of relay Y, and the lower winding of relay XYS. It is obvious that the flow of current through the lower winding in this circuit will be in the direction opposite to the arrow so that the contacts of relay XYS are operated to the reverse position. Subsequent to the initial operation of relay XYS, the relay is deenergized when both relays X and Y eventually pick up, but relay XYS remains in the position to which it was last operated, a characteristic of these relays.

During the period of increase, as segment 17 continues to pass under brushes 15 and 16, relay X will be deenergized and releases prior to the deenergization of relay Y. At this time, a circuit will be established from terminal B over back contact *a* of relay X, front contact *d* of either relay ADD or relay SUB (one closed as described shortly), back contact *b* of relay X, front contact *b* of relay Y, and the lower winding of relay XYS to terminal N. The flow of current in this circuit is such as to cause relay XYS to operate its contacts to their reverse position. Thus, at the end of the recording of an increase unit of change, the sensing stick relay operates its contacts to a position opposite to that which is originally assumed. The purpose of the operation will shortly become apparent. During periods of decrease, a similar circuit will be traced over front contact *a* of relay X, back contact *a* of relay Y, front contact *d* of relay ADD or SUB, back contact *b* of relay Y, front contact *b* of relay X, and the upper winding of relay XYS. Flow of current in this winding obviously causes the relay contacts to close in their normal position.

A direction stick relay UD is used to establish the direction of the initial change from the selected reference level or zero point of the counting chain. This relay in effect repeats the position of relay XYS, but only when the counting chain is in its zero position with all relays released. The circuits for relay UD may be traced from terminal B over back contact *c* of relay 10, back contact *d* of relay ODD, front contact *b* of relay XYP, and either normal contact *a* of relay XYS and the upper winding of relay UD to terminal N, or reverse contact *a* of relay XYS and the lower winding of relay UD to terminal N. If relay XYS has its normal contacts closed, the upper winding of relay UD is energized with the flow of current through the winding in the direction to operate the relay to close its normal contacts. Flow of current through the lower winding of relay UD when relay XYS has its reverse contacts closed is in the direction to cause relay UD to close its reverse contacts. Since relay UD is of the magnetic stick type, it remains with its contacts closed in the position to which it was last operated when the counting chain operation continues and back contact *c* of relay 10 opens.

The driver relays ADD and SUB are used to control the pulsing which drives the relay counting chain in the manner previously described. The energizing circuit for the selected relay is completed at the end of the change period during the release cycle or sequence of relays X and Y. Each of the driver relays is provided with two energizing circuits which are selected by contacts of relays UD, XYS, X and Y. The first circuit for relay ADD may be traced from terminal B at back contact *a* of relay X over front contact *a* of relay XYP, normal contact *b* of relay XYS, back contact *c* of relay X, front contact *c* of relay Y, normal contact *a* of relay UD, and the winding of relay ADD to terminal N. The second circuit for this relay includes front contact *a* of relay X, back contact *a* of relay Y, front contact *a* of relay XYP, reverse contact *b* of relay XYS, back contact *c* of relay Y, front contact *c* of relay X, and reverse contact *a* of relay UD.

A first circuit for relay SUB extends from terminal B over front contact *a* of relay X, back contact *a* of relay Y, front contact *a* of relay XYP, reverse contact *b* of relay XYS, back contact *c* of relay Y, front contact *c* of relay X, normal contact *b* of relay UD, and the winding of relay SUB to terminal N. The second circuit for relay SUB includes back contact *a* of relay X, front contact *a* of relay XYP, normal contact *b* of relay XYS, back contact *c* of relay X, front contact *c* of relay Y, and reverse contact *b* of relay UD. Each of these relays has a stick circuit which extends from front contact *a* of relay XYP over front contact *a* of the energized relay itself. Since, as previously discussed, relay XYS is operated to its opposite position during the release period sequence of relays X and Y, the selected driver relay is held energized over the stick circuit until the release of relay XYP.

The contacts of relay UD, which are included in the energizing circuits for the driver relays, are for the purpose of reversing the circuit arrangement in the event that the initial change from the selected reference level (chain zero position) is a decrease rather than an increase. Thus, regardless of direction, similar counts may be added as they move in the first or second direction from the zero point. Contacts *b* of relay XYS are included, of course, to establish the direction of each change and also to prevent any count being entered in the counting chain in case the commutator is hovering about a relatively stationary position of the indicator. This situation will be more fully discussed in the operational description of the system.

Under normal conditions, the information as to the total deviation from the zero reference as contained in the counting chain is transmitted to a remote central office either at preset time intervals or when the total change has reached a preselected amount. For example, when the counting chain is full so that relay 100 is picked up, a circuit may be closed over front contact *e* of relay 100 which will initiate the transmission of an information code to the remote office. This information transmission may also be initiated at selected intervals of time regardless of the accumulated deviation. Either or both of these methods may be used to normally initiate the transmission of the information. Any well known remote control and/ or indication system may be used to transmit the indications. As a specific example, the system used may be as disclosed in Letters Patent of the United States 2,411,375, granted to me November 19, 1946, for a Remote Control System.

It may be desirable, however, to initiate an indication code for a small number of counts when the rate of change is fast. This may be of advantage in distinguishing between so called "upset" conditions and less serious accumulated deviations. To provide this feature, the driver circuits of my invention include a rate of change timing relay TM and a timing repeater relay TMP. When any count occurs, so that relay ADD or relay SUB is picked up, relay TM is energized over either front contact *e* of relay SUB or back contact *e* of this relay and front contact *e* of relay ADD. Relay TM is a slow-release relay so that its front contacts remain closed for a selected period of time after the relay is deenergized. When the energized one of relays ADD and SUB releases, a circuit is completed over back contacts *e*, in series, of these two relays and front contact *a* of relay TM to energize relay TMP. This relay then completes a stick circuit over its own front contact *a* and front contact *a* of relay TM. Upon the release of relay TM at the expiration of its timing period, relay TMP is likewise deenergized and releases. If, however, relay ADD or relay SUB picks up before this timing period has expired, relay TM will be reenergized and relay TMP will continue to hold up with its front contacts closed.

As shown in the drawing, the circuits are so arranged that if two or three such counts occur in rapid order, before relays TM and TMP can release, the transmission of information is initiated by supplying energy to the code start circuits. If, for example, the rate of change is rapid so that relay 10 and then relay 20 pick up while relay TMP is still energized, a momentary circuit is completed during the transfer between back contact d and front contact d of relay 20, the circuit being completed from positive terminal B at front contact d over the continuity transfer contact and front contact b of relay TMP to the code start circuits to immediately initiate the transmission of the information as to the rapid rate of change. Under ordinary conditions, front contact b of relay TMP will be open when contact d of relay 20 transfers between its back and front points so that no energy is supplied to the start circuit. Contacts d of relays 40, 60, 80, and 100 are similarly connected so that the rapid entry of two or three counts at any point in the chain operation will cause the initiation of the code transmission. It is obvious that other short count totals could be chosen upon which the initiation of an "upset" code transmission will occur.

I shall now describe the operation of the driver circuits and the counting chain to enter and record the changes which occur in the item being measured by the indicator and its commutator IC. I shall assume that the counting chain is at zero, the selected reference point, and that the commutator is moving downward in the drawing in the direction of an increase in the item measured. As one of the conducting segments, such as segment 17, passes underneath brushes 14, 15, and 16, relays X and Y are energized in sequence. When relay X picks up prior to the energization of relay Y, the previously traced circuit is completed for energizing relay XYS through its upper winding so that the relay contacts are closed in the normal position. Shortly thereafter, with both sensing relays picked up, relay XYP is also energized and picks up. At this time, with the counting chain in its zero position, the circuit including back contact c of relay 10 and back contact d of relay ODD is completed over normal contact a of relay XYS so that the upper winding of relay UD is energized and the relay operates its contacts to their normal position. Although relay XYS is deenergized upon the opening of back contact b of relay Y, and further by the opening of back contact a of relay XYP, its contacts remain in the normal position to which they were last operated prior to the deenergization of the relay.

As the commutator IC moves onward in its direction of increase, relay X is deenergized and releases when segment 17 clears from its position beneath brush 15. At this time, a circuit is completed for energizing relay ADD, the circuit including back contact a of relay X, front contact a of relay XYP, normal contact b of relay XYS, back contact c of relay X, front contact c of relay Y, and normal contact a of relay UD. With relay X released, relay XYP is deenergized, but since this relay is slow release, its front contact a remains closed during this period so that relay ADD is energized. The closing of front contact a of relay ADD completes its stick circuit so that this relay holds upon the release of relay Y to open its front contact c. The energization of relay ADD completes the circuits for energizing relay 10, as previously described, and relay 10 picks up to enter one count into the chain. Relay XYP now releases at the end of its slow-release period to deenergize relay ADD which likewise releases. With relay X released, a circuit is completed upon the closing of front contact d of relay ADD, also including back contact b of relay X and front contact b of relay Y, to energize the lower winding of relay XYS. This relay then operates its contacts to their reverse position. However, this operation has no effect upon the driver relays due to the positions of contacts c of relays X and Y.

The commutator IC continues to move in the direction of increase. Similar action occurs as each conducting segment passes under the brushes 14, 15, and 16 and additional counts are entered into the counting chain so that relays 20, 30, etc., are energized and pick up.

It is now assumed that, with three counts having been entered into the counting chain so that relays 10, 20, and 30 are picked up, a ten digit decrease occurs in the item being measured. A conducting segment therefore moves upward under the brushes, completing first the circuit for relay Y and later the circuit for relay X. With back contact b of relay X and front contact b of relay Y simultaneously closed, the previously traced circuit is completed for energizing the lower winding of relay XYS, the circuit including back contact a of relay XYP. As a result, the contacts of relay XYS are operated to close in their reverse position, if not already occupying that position. Shortly, relay XYP is energized with both sensing relays picked up. However, relay UD receives no energy at this time since back contact c of relay 10 is open and relay UD remains with its contacts closed in the normal position.

As the decrease continues, the circuit for relay Y is opened as the segment clears brush 16 and this relay releases. This completes a circuit for energizing relay SUB which may be traced over front contact a of relay X, back contact a of relay Y, front contact a of relay XYP which is still closed although the relay is deenergized, reverse contact b of relay XYS, back contact c of relay Y, front contact c of relay X, and normal contact b of relay UD to the winding of relay SUB. Relay SUB picks up and closes its front contact a to complete a stick circuit to hold the relay energized. The closing of front contact d of relay SUB completes a circuit including back contact b of relay Y and front contact b of relay X to energize the upper winding of relay XYS so that this relay operates its contacts to their normal position. This action has no effect upon the circuit operation at this time since back contact c of relay X is still open. The operation of relay SUB to open its back contact b deenergizes counting relay 30 in the manner previously described and one count is subtracted from the previous total recorded in the counting chain. Relay XYP shortly releases and relay SUB is deenergized and also releases completing the subtraction of a count from the chain. Relay X subsequently releases and the driver circuits are prepared for the next count whether it be an increase or decrease.

If the commutator IC hovers about one point in the scale, that is, is not stationary but does not move a sufficient distance to indicate a ten digit change in the measured item, the system must not register a count into the chain. The circuits of my invention prevent the entry of a count into the chain under these conditions. With the commutator hovering in slight variations on each side of a relatively steady state condition, the sensing relays X and Y will be energized in reverse sequences. For example, as the commutator moves slightly in the direction of an increase in the measured item, relay X and then relay Y will be energized and pick up in the usual sequence. However, as the commutator reverses its motion, relay Y and then relay X will release. Under these conditions, relay XYS will initially be operated to close its normal contacts, the previously traced circuit over front contact b of relay X and back contact b of relay Y being completed to energize the upper winding of the stick relay. Relay XYP will, of course, be energized and pick up when front contacts of both sensing relays close and this relay will naturally remain with its front contacts closed, after deenergization, for its slow-release period. However, since relay Y releases first, the circuits for relays ADD and SUB are not completed. The circuit over normal contact b of relay XYS remains open initially at back contact c of relay X. When this contact finally closes, front contact c of relay Y is already open so that the circuit remains interrupted. If the initial movement of the commutator is in the direction of a decrease in the measured item, relay Y and then relay X pick up, operating relay XYS to its reverse position. However, as the commutator returns toward the steady state condition, relay X and then relay Y release so that the circuits for relays ADD and SUB over reverse contact *b* of relay XYS are open, first at back contact *c* of relay Y and, when this contact closes, at front contact *c* of relay X. Thus the circuit arrangement provided by my system, including normal and reverse contacts *b* of relay XYS and front and back contacts *c* of both relays X and Y, prevents the entering of a count in either direction into the counting chain under a relatively steady state condition of the measured item with the commutator hovering about this position, but never registering a complete ten digit change.

If the initial change from the zero reference point is in the direction of a decrease in the measured item, relays XYS and UD are both operated to their reverse positions. At the proper time, relay ADD will be energized over its previously described second circuit and a count will be entered into the counting chain showing a unit change away from the zero position. If the next change is towards an increase in value of the measured item, relay SUB will be energized over its previously described second circuit and the single count recorded by relay 10 will be removed from the counting chain. If the succeeding change is also in the direction of an increase, relay UD at this time will be energized to operate to its normal position, the circuit for this relay having been reclosed at back contacts *c* and *d* of relays 10 and ODD, respectively. Thus the initial direction of count as recorded by relay UD will be reversed at any time that the total count recorded in the counting chain again passes through the zero reference point and continues in the opposite direction. This operation of relay UD, together with the insertion of normal and reverse contacts *a* and *b* of relay UD into the energizing circuits for relays ADD and SUB, assures that the total deviation of the measured item at any time, in either direction from the selected reference level, will be correctly recorded in the counting chain.

It has already been mentioned, but should be again noted, that upon each transmission of the information from the counting chain to the remote central office, the counting chain is reset to its zero position. This is assured by contact 11 which opens to interrupt the supply, from positive terminal B of the local source, to bus wires 12 and 13. Contact 11 is controlled by the local apparatus of the remote control system of which the code start circuits, referred to in the drawing, are a part. This control system, as previously mentioned, may be as shown in my prior Patent No. 2,411,375. As herein described, this apparatus is arranged to open contact 11 during the transmission of each indication code from this location. Alternately, it may be desirable to open contact 11 to establish a new reference level only upon reception of a specific control from the remote central office. If the reference level is to remain stationary, contact 11 is of course omitted. With bus wires 12 and 13 deenergized, all of the counting chain relays held energized at that time are deenergized by interruption of their stick circuits and all relays release and the chain resumes its zero position. It is also to be noted that the stick circuit for relay ODD, over its front contact *a* and front contacts *c*, in multiple, of relays ADD and SUB, is likewise supplied with energy from bus wire 13 so that relay ODD is also released upon the reset of the counting chain.

The circuit arrangement of my invention as hereinbefore described and shown thus provides driver circuits for a reversible counting chain which sense each unit of change in a measured item and the direction in which the change occurs. This sensing is transformed through the circuits of my invention into a driving pulse for a counting chain which adds or subtracts the count from the previous total stored in that chain, the addition or subtraction being in accordance with the registered direction of the new change in the measured item. The direction of the initial change, after the counting chain has been reset to a zero reference point, is separately detected and recorded so that this change and subsequent changes will be properly registered with due regard to the initial direction of the count. Thus the initial change and subsequent changes in the same direction are entered as additions to the counting chain total whether they be in a first or a second direction. Any subsequent changes in the opposite direction are automatically entered as subtraction counts from the previous total. In addition, the circuits of my invention provide for initiating the transimission of an indication from the counting chain if the rate of change is relatively rapid, thus providing an instant notification of "upset" conditions which may indicate a fault or failure in the system.

Although I have hereinbefore described and shown but one form of driver circuits for reversible counting chains embodying my invention, it is to be understood that changes and modifications may be made therein within the scope of the appended claims without departing from the spirit and scope of my invention.

Having thus described my invention, what I claim is:

1. In combination with a reversible counting means effective to count unit changes of a measured quantity in either direction from a selected reference point, an indicating means for measuring unit changes in said quantity in a first direction and a second direction, a count sensing means controlled by said indicating means for detecting each unit change of said quantity, a direction sensing means controlled by said count sensing means when a unit change is detected for registering the direction of that change, a direction stick means controlled jointly by said counting means and said direction sensing means for retaining the registry of the direction of the unit change detected when the counting means is in its zero count condition, a driver means operable to a first and a second position and having connections for driving said counting means to add or subtract a count to the existing total count according as said driver means occupies its first and its second position respectively, control circuit means connected to said driver means and controlled jointly by said count sensing means, said direction sensing means and said direction stick means for operating said driver means to its first or its second position when said count sensing means detects a completed unit change according as the direction registered by said direction sensing means agrees or disagrees with the direction of the initial change retained in said direction stick means, an indication transmission means operable at times for reporting the total count recorded by said counting means, a first starting circuit means for said transmission means controlled by said counting means for initiating operation of said transmission means when a preselected total count is recorded, a timing means controlled by said driver means for measuring a selected period of time subsequent to each operation of said driver means, a second starting circuit means for said transmission means controlled jointly by said counting means and said timing means for initiating operation of said transmission means if a preselected number of unit changes in the same direction occur prior to the termination of said selected period of time, and reset means controlled by said transmission means and having connections for resetting said counting means to its zero position during each operation of said transmission means.

2. In combination with a reversible counting means effective to count unit changes of a measured quantity in either direction from a selected reference point, an indicating means for measuring unit changes in said quantity in a first direction and a second direction, a count sensing means controlled by said indicating means for detecting each unit change of said quantity, a direction sensing means controlled by said count sensing means when a unit change is detected for registering the direction of that change, a direction stick means controlled jointly by said counting means and said direction sensing means for retaining the registry of the direction of the unit change detected when the counting means is in its zero count condition, a driver means operable to a first and a second position and having connections for driving said counting means to add or subtract a count to the existing total count according as said driver means occupies its first and its second position respectively, control circuit means connected to said driver means and controlled jointly by said count sensing means, said direction sensing means and said direction stick means for operating said driver means to its first or its second position when said count sensing means detects a completed unit change according as the direction registered by said direction sensing means agrees or disagrees with the direction of the initial change retained in said direction stick means, and a rate of change measuring means including a timing means and an indicating circuit means, said timing means controlled by said driver means for measuring a selected period of time subsequent to each operation of said driver means, said indicating circuit means controlled by said timing means and operably connected to said counting means for indicating the entry of a preselected number of unit changes into said counting means within said selected period of time.

3. In combination, a reversible relay counting chain having a plurality of relays energized and deenergized in sequence as add and subtract unit counts respectively are entered into said chain, a unit count change indicating device, a first and a second sensing relay and an energizing circuit therefor controlled by said device and including a first circuit path connected to said first sensing relay and a second circuit path connected to said second sensing relay, said circuit paths being completed in ascending sequence when said device indicates an increase in the unit count and in descending sequence when said device indicates a decrease in the unit count; a sensing repeater relay and an energizing circuit therefor including in series a front contact of each sensing relay, a sensing stick relay operable to a first and a second position, a first energizing circuit for said sensing stick relay including a back contact of said repeater relay and contacts of said sensing relays arranged to operate said sensing stick relay to its first position when said device indicates an increase in the unit count, a second energizing circuit for said sensing stick relay including a back contact of said repeater relay and other contacts of said sensing relays arranged to operate said sensing stick relay to its second position when said device indicates a decrease in the unit count, a first and a second driver relay, an energizing circuit for said first driver relay including a first position contact of said stick relay, a front contact of said repeater relay, and contacts of said sensing relays closed in series at the end of each count increase indication; an energizing circuit for said second driver relay including a second position contact of said stick relay, a front contact of said repeater relay, and contacts of said sensing relays closed in series at the end of each count decrease indication; and driver circuits for said counting chain including contacts of said driver relays and effective to enter add and subtract counts into said chain according as said first or said second driver relay is energized respectively.

4. In combination, a reversible relay counting chain having a plurality of relays energized and deenergized in sequence as add and subtract unit counts respectively are entered into said chain, a unit count change indicating device, a first and a second sensing relay and an energizing circuit therefor controlled by said device and including a first circuit path connected to said first sensing relay and a second circuit path connected to said second sensing relay, said circuit paths being completed in ascending sequence when said device indicates an increase in the unit count and in descending sequence when said device indicates a decrease in the unit count; a sensing repeater relay and an energizing circuit therefor including in series a front contact of each sensing relay, a sensing stick relay operable to a first and a second position, a first energizing circuit for said sensing stick relay including a back contact of said repeater relay and contacts of said sensing relays arranged to operate said sensing stick relay to its first position when said device indicates an increase in the unit count, a second energizing circuit for said sensing stick relay including a back contact of said repeater relay and other contacts of said sensing relays arranged to operate said sensing stick relay to its second position when said device indicates a decrease in the unit count, an initial direction stick relay operable to a first and a second position and holding therein when deenergized; an energizing circuit arrangement for said direction stick relay including a contact closed by said counting chain when in its zero count position, a front contact of said repeater relay, and first and second position contacts of said sensing stick relay to operate said direction stick relay in agreement with said sensing stick relay during the initial unit count change; a first and a second driver relay; an energizing circuit arrangement for said first driver relay including a front contact of said repeater relay, a first path including first position contacts of said sensing stick relay and said direction stick relay, and a second path including second position contacts of said sensing stick relay and said direction stick relay; an energizing circuit arrangement for said second driver relay including a front contact of said repeater relay, a first path including a second position contact of said sensing stick relay and a first position contact of said direction stick relay, and a second path including a first position contact of said sensing stick relay and a second position contact of said direction stick relay; and driver circuits for said counting chain including contacts of said driver relays and effective to enter add and subtract counts into said chain according as said first or said second driver relay is energized respectively.

References Cited in the file of this patent

UNITED STATES PATENTS

| | | |
|---|---|---|
| 1,838,961 | Robinson | Dec. 29, 1931 |
| 2,636,078 | Marsh | Apr. 21, 1953 |
| 2,883,588 | Leonard | Apr. 21, 1959 |

FOREIGN PATENTS

| | | |
|---|---|---|
| 644,041 | Great Britain | Oct. 4, 1950 |